(12) United States Patent
Takazoe et al.

(10) Patent No.: US 11,792,023 B2
(45) Date of Patent: Oct. 17, 2023

(54) COMMUNICATION APPARATUS, COMMUNICATION SYSTEM, AND COMMUNICATION METHOD

(71) Applicant: Panasonic Intellectual Property Management Co., Ltd., Osaka (JP)

(72) Inventors: Tomoki Takazoe, Kanagawa (JP); Yoichi Masuda, Osaka (JP); Kenji Yasu, Osaka (JP); Yuji Unagami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 290 days.

(21) Appl. No.: 17/270,378

(22) PCT Filed: May 10, 2019

(86) PCT No.: PCT/JP2019/018805
§ 371 (c)(1),
(2) Date: Feb. 22, 2021

(87) PCT Pub. No.: WO2020/044667
PCT Pub. Date: Mar. 5, 2020

(65) Prior Publication Data
US 2021/0392000 A1    Dec. 16, 2021

(30) Foreign Application Priority Data
Aug. 28, 2018 (JP) ................. 2018-159395

(51) Int. Cl.
*H04L 9/32* (2006.01)
*H04L 9/30* (2006.01)

(52) U.S. Cl.
CPC .............. *H04L 9/3268* (2013.01); *H04L 9/30* (2013.01)

(58) Field of Classification Search
CPC ................................ H04L 9/3268; H04L 9/30
See application file for complete search history.

(56) References Cited

U.S. PATENT DOCUMENTS 8,635,442 B2 * 1/2014 Agrawal ............... H04L 9/3268
                                            713/176
9,490,986 B2 * 11/2016 Niemela ............. H04L 63/1466
(Continued)

FOREIGN PATENT DOCUMENTS

JP  2015-132943 A   7/2015
JP  WO2015092967 A1  3/2017

OTHER PUBLICATIONS

International Search Report issued in corresponding International Patent Applicatoin No. PCT/JP2019/018805, dated Jun. 18, 2019, with English translation.

*Primary Examiner* — Yonas A Bayou
(74) *Attorney, Agent, or Firm* — McDermott Will & Emery LLP

(57) ABSTRACT

A GM acquires a first certificate revocation list designating revoked public key certificates and distributed from a certificate authority server. The GM generates a second certificate revocation list produced by extracting information on a plurality of home electric appliances from the first certificate revocation list. The GM restricts communication with a device for which the public key certificate is revoked, by distributing the second certificate revocation list generated to the plurality of home electric appliances.

2 Claims, 5 Drawing Sheets

(56) References Cited

U.S. PATENT DOCUMENTS

| | | |
|---|---|---|
| 10,411,904 B2 | 9/2019 | Maeda et al. |
| 2005/0021941 A1* | 1/2005 | Ohmori ................. H04L 9/3268 |
| | | 713/156 |
| 2007/0294526 A1* | 12/2007 | Medvinsky .......... H04N 21/235 |
| | | 713/158 |
| 2009/0031131 A1* | 1/2009 | Qiu ..................... H04L 63/0442 |
| | | 713/172 |
| 2009/0113543 A1* | 4/2009 | Adams ................. H04L 9/3271 |
| | | 726/20 |
| 2009/0187983 A1* | 7/2009 | Zerfos ................. H04W 12/069 |
| | | 726/10 |
| 2009/0249062 A1* | 10/2009 | Thomas .............. H04W 12/069 |
| | | 713/158 |
| 2010/0138652 A1* | 6/2010 | Sela ..................... H04L 9/3228 |
| | | 713/158 |
| 2012/0054487 A1* | 3/2012 | Sun ..................... H04L 9/3268 |
| | | 713/158 |
| 2014/0006788 A1* | 1/2014 | Ignatchenko ......... H04L 9/3263 |
| | | 713/175 |
| 2014/0129829 A1* | 5/2014 | Unagami .............. H04L 9/3268 |
| | | 713/158 |
| 2016/0277195 A1* | 9/2016 | Maeda ................. H04L 9/3268 |
| 2017/0277884 A1 | 9/2017 | Hsu et al. |

\* cited by examiner

FIG. 3A

```
List(
    CERTIFICATE SERIAL NUMBER#1(CERTIFICATE FOR HOME ELECTRIC APPLIANCE 16b)
    CERTIFICATE SERIAL NUMBER#2(CERTIFICATE FOR HOME ELECTRIC APPLIANCE 16c)
    CERTIFICATE SERIAL NUMBER#3(CERTIFICATE FOR HOME ELECTRIC APPLIANCE X)
    ...
    ...
)
SIGNATURE BY CA
```

FIG. 3B

```
List(
    CERTIFICATE SERIAL NUMBER#1(CERTIFICATE FOR HOME ELECTRIC APPLIANCE 16b)
    CERTIFICATE SERIAL NUMBER#2(CERTIFICATE FOR HOME ELECTRIC APPLIANCE 16c)
)
SIGNATURE BY GM
```

COMMUNICATION APPARATUS, COMMUNICATION SYSTEM, AND COMMUNICATION METHOD

CROSS-REFERENCE OF RELATED APPLICATIONS

This application is the U.S. National Phase under 35 U.S.C. § 371 of International Patent Application No. PCT/JP2019/018805, filed on May 10, 2019, which in turn claims the benefit of Japanese Patent Application No. 2018-159395, filed on Aug. 28, 2018, the entire disclosures of which Applications are incorporated by reference herein.

TECHNICAL FIELD

The present disclosure relates to data processing technologies and, more particularly, to a communication apparatus, a communication system, a communication method, and a computer program.

BACKGROUND ART

Mutual certification using a public key infrastructure is widely practiced. In the public key infrastructure, a certificate authority (also referred to as "CA"), which is third party trusted by a communication device, issues a public key certificate (also referred to as "digital certificate") of the communication device.

The CA issues a certificate revocation list (hereinafter, also referred to as "CRL") designating the serial number of a revoked public key certificate. The communication device stores the CRL issued by the CA, and, when the serial number of the public key certificate of the destination device that the communication device communicates with is designated by the CRL, the communication device determines that the public key certificate of the destination device is revoked.
[Patent Literature 1] JP2015-132943

SUMMARY OF INVENTION

Technical Problem

Serial numbers of revoked public key certificates continue to be written in the CRL in an irreversible manner. Therefore, the size of a CRL increases gradually and may grow to 100-1000 kilobytes or megabytes. Meanwhile, some devices that use the CRL issued by the CA have many constraints on hardware resources such as CPU and memory. In these devices, efficient use of hardware resources is called for.

The disclosure addresses the above-described issue, and one purpose thereof is to provide a technology of suppressing the data size of a certificate revocation list.

Solution to Problem

A communication apparatus according to an embodiment of the present disclosure is a communication apparatus adapted to manage a plurality of devices and includes: an acquisition unit that acquires a first certificate revocation list designating revoked public key certificates and distributed from a certificate authority; a generation unit that generates a second certificate revocation list produced by extracting information on the plurality of devices from the first certificate revocation list acquired by the acquisition unit; and a distribution unit that restricts communication with a device for which the public key certificate is revoked, by distributing the second certificate revocation list generated by the generation unit to the plurality of devices.

Another embodiment of the present disclosure relates to a communication system. The communication system includes: a plurality of devices; and a management apparatus that manages the plurality of devices. The plurality of devices restrict communication with a device for which a public key certificate is revoked, the management apparatus includes: an acquisition unit that acquires a first certificate revocation list designating revoked public key certificates and distributed from a certificate authority; a generation unit that generates a second certificate revocation list produced by extracting information on the plurality of devices from the first certificate revocation list acquired by the acquisition unit; and a distribution unit that distributes the second certificate revocation list generated by the generation unit to the plurality of devices.

Still another embodiment of the present disclosure relates to a communication method. The method includes: acquiring, using a communication apparatus adapted to manage a plurality of devices, a first certificate revocation list designating revoked public key certificates and distributed from a certificate authority; generating, using the communication apparatus, a second certificate revocation list produced by extracting information on the plurality of devices from the first certificate revocation list; and restricting, using the communication apparatus, communication with a device for which the public key certificate is revoked, by distributing the second certificate revocation list to the plurality of devices.

Optional combinations of the aforementioned constituting elements, and implementations of the present disclosure in the form of computer programs, recording mediums encoded with computer programs, etc. may also be practiced as additional modes of the present disclosure.

Advantageous Effects of Invention

According to the present disclosure, the data size of a certificate revocation list is suppressed.

BRIEF DESCRIPTION OF DRAWINGS

FIG. 3A shows an example of the original CRL, and FIG. 3B shows an example of the intra-HEMS CRL;

DESCRIPTION OF EMBODIMENTS

Figure 1:
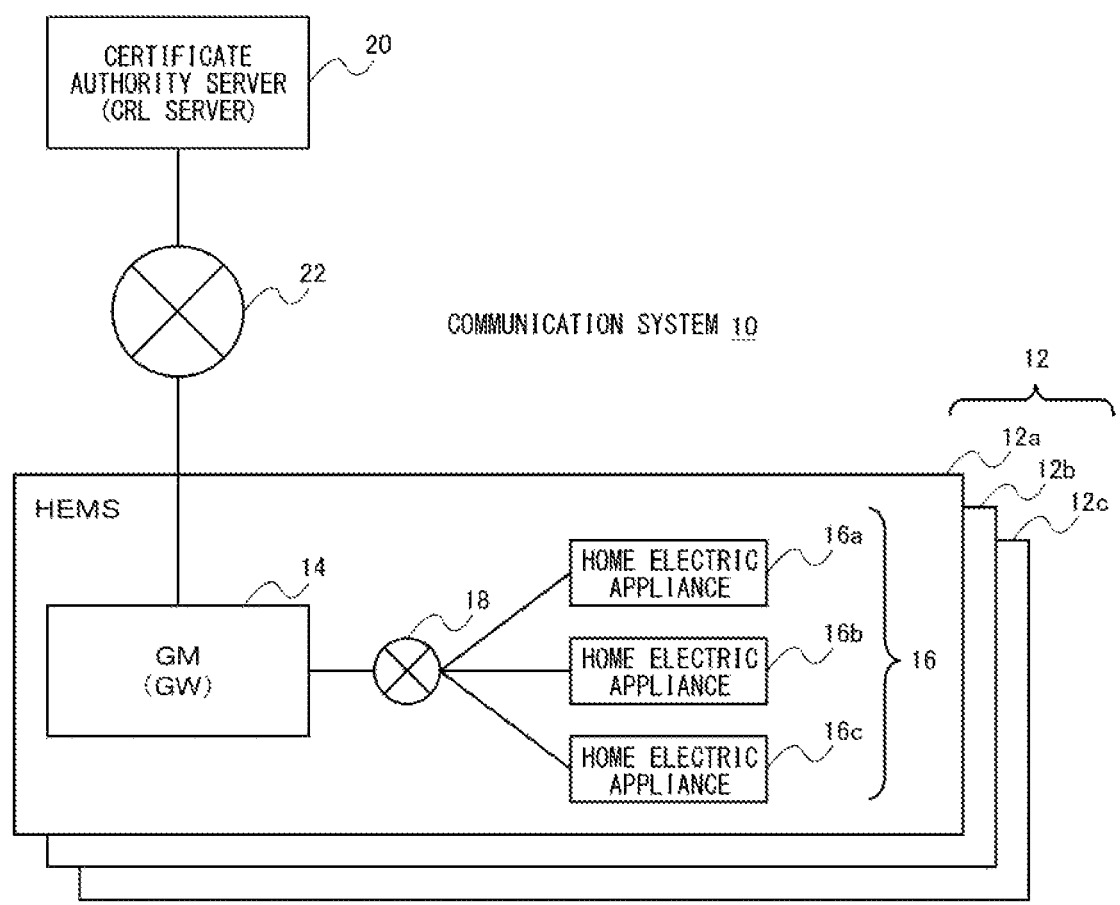
FIG. 1 shows a configuration of a communication system according to an embodiment.

The device or the entity that executes the method according to the disclosure is provided with a computer. By causing the computer to run a program, the function of the device or the entity that executes the method according to the disclosure is realized. The computer is comprised of a processor that operates in accordance with the program as a main hardware feature. The disclosure is non-limiting as to the type of the processor so long as the function is realized by running the program. The processor is comprised of one or a plurality of electronic circuits including a semiconductor integrated circuit (IC) or a large-scale integration (LSI). The terms IC and LSI may change depending on the integration degree, and the processor may be comprised of a system LSI, a very large scale integration (VLSI), or an ultra large scale integration (USLI). A field programmable gate array (FPGA) programmed after the LSI is manufactured, or a reconfigurable logic device, in which the connections inside the LSI are reconfigurable or the circuitry blocks inside the LSI can be set up, can be used for the same purpose. The plurality of electronic circuits may be integrated in one chip or provided in a plurality of chips. The plurality of chips may be aggregated in one device or provided in a plurality of devices. The program is recorded in a non-transitory recording medium such as a computer-readable ROM, optical disk, and hard disk drive. The program may be stored in a recording medium in advance or supplied to a recording medium via wide area communication network including the Internet.

A summary of the embodiment is given below. Recently, it is envisaged that home energy management systems (HEMS) for managing energy used at home will be used popularly. A device in the HEMS (which can be said to be a node participating in the HEMS and is also referred to as "HEMS device" hereinafter) needs to maintain a CRL issued from a CA inside the device in order to check whether or not the public key certificate of another device is revoked. The size of a CRL increases irreversibly and may grow to 100-1000 kilobytes or megabytes.

HEMS devices encompass sensors and home electric appliances. These devices have many constraints on hardware resources such as CPU and memory, which may be under a heavy load when a CRL having a large size is stored or referred to. Further, ample hardware resources mounted on a HEMS device increases the cost of the HEMS device.

The HEMS according to the embodiment is of a model in which a group manager apparatus (hereinafter, "GM") manages the key of the HEMS device, and the HEMS device trusts the GM. We have thought that the CRL distributed by the GM to the HEMS device under its control need only include information on the device for which the GM manages the key and for which the public key certificate is revoked and need not include information on a device not managed by the GM (e.g., a device in another residence).

Accordingly, the GM according to the embodiment creates a new CRL limited to the information on the HEMS devices under its control for which the GM manages the key, based on the CRL issued from the CA, and distributes the new CRL to the HEMS devices under its control. This makes it possible to reduce the data size of the CRL that the HEMS devices under the control of the GM should maintain even if the size of the original CRL issued by the CA is increased.

FIG. 1 shows a configuration of a communication system 10 according to an embodiment. The communication system 10 includes a HEMS 12a, a HEMS 12b, a HEMS 12c, which are a plurality of information processing systems built in the residences of a plurality of users, and a certificate authority server 20. The HEMS 12a, the HEMS 12b, and the HEMS 12c have a similar configuration and are generically referred to as "HEMS 12".

The HEMS 12 includes a GM 14, a home electric appliance 16a, a home electric appliance 16b, and a home electric appliance 16c (hereinafter, generically referred to as "home electric appliances 16"). In the embodiment, a home electric appliance is shown as exemplifying the device participating in the HEMS 12 (HEMS device). At least some of the HEMS devices may be electronic devices (e.g., PCs, smartphones), electric facilities (e.g., smart meters, storage batteries), or sensors (e.g., temperature sensors, illuminance sensors). The home electric appliance 16 and the GM 14 are communication devices having a communication function and transmit and receive data via a home network 18.

The GM 14 manages the status and operation of the plurality of HEMS devices. More specifically, the GM 14 manages the production, storage, purchase, consumption, etc. of the energy in the respective HEMS devices. The GM 14 can be said to be a HEMS controller. Further, the GM 14 is connected to the certificate authority server 20 via an external network 22, which could include LAN, WAN, Internet, etc. In practice, each of the GMs 14 of the plurality of HEMSs built in a plurality of residences is connected to the certificate authority server 20. The GM 14 has a gateway function and mediates communication between the home electric appliances 16 and other devices (e.g. user terminals, etc.) on the side of the external network 22.

The certificate authority server 20 is an information processing apparatus configured to exhibit a publicly known function as a CA. Further, the certificate authority server 20 includes a function of a CRL server configured to provide a CRL that lists the serial numbers of revoked public key certificates. The certificate authority server 20 according to the embodiment transmits, to the GM 14 of each HEMS 12, a CRL having a format defined in the X.509 standard and having a signature of the certificate authority server 20 appended thereto.

Figure 2:
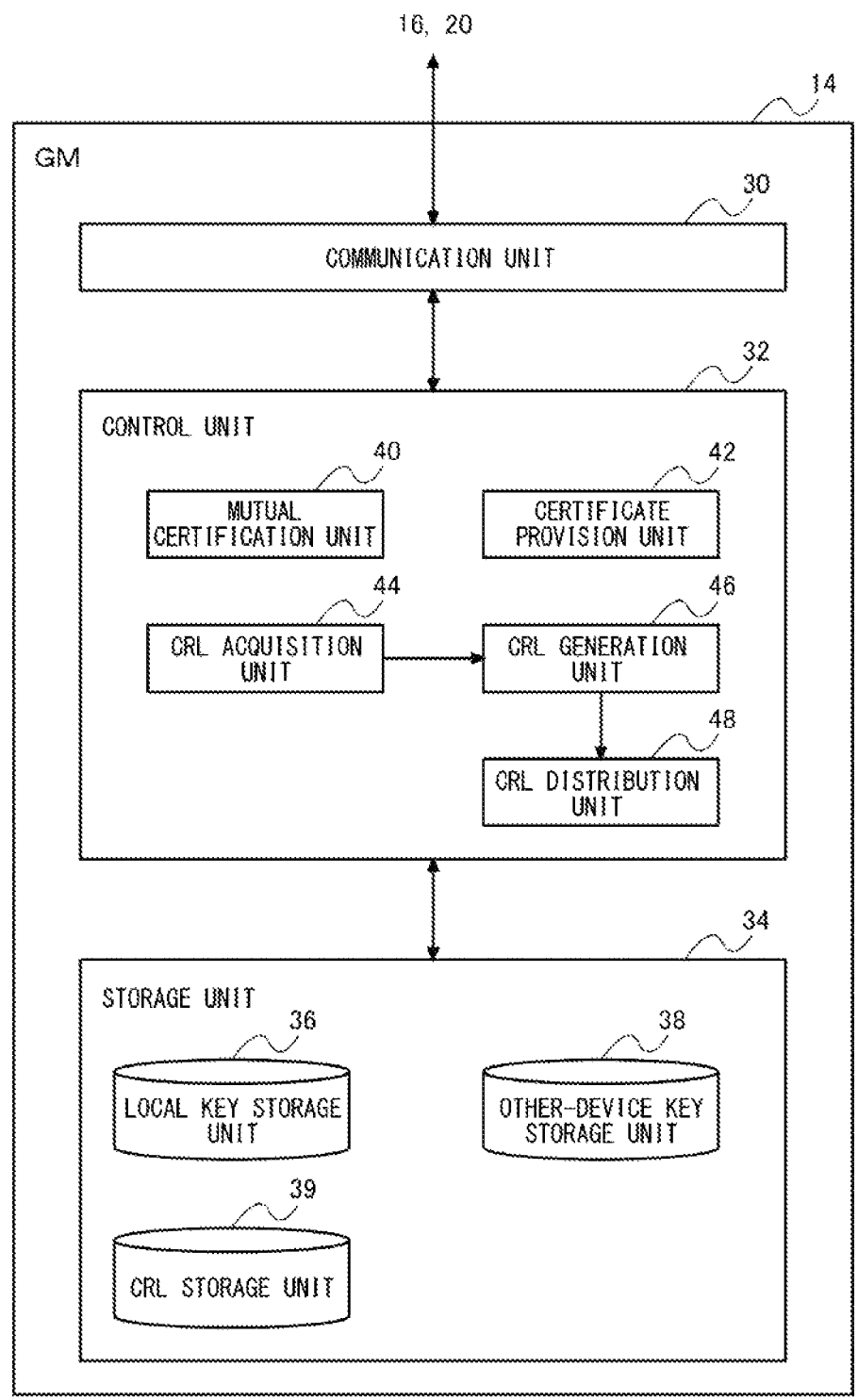
FIG. 2 is a block diagram showing the functional blocks of the GM of FIG. 1.

FIG. 2 is a block diagram showing the functional blocks of the GM 14 of FIG. 1. The blocks depicted in the block diagram of this disclosure are implemented in hardware such as devices and mechanical apparatus exemplified by a CPU and a memory of a computer, and in software such as a computer program. FIG. 2 depicts functional blocks implemented by the cooperation of these elements. Therefore, it will be understood by those skilled in the art that the functional blocks may be implemented in a variety of manners by a combination of hardware and software.

The GM 14 includes a communication unit 30, a control unit 32, and a storage unit 34. The communication unit 30 communicates with an external apparatus according to a predetermined communication protocol. The control unit 32 performs various data processes as a group manager (stated otherwise, a HEMS controller) of the HEMS 12. The control unit 32 transmits and receives data to and from the home electric appliances 16 and the certificate authority server 20 via the communication unit 30. The storage unit 34 stores data referred to and updated by the control unit 32.

The storage unit 34 includes a local key storage unit 36, an other-device key storage unit 38, and a CRL storage unit 39. The CRL storage unit 39 stores the CRL distributed from the certificate authority server 20. The local key storage unit 36 stores the secret key of the GM 14 and the public key certificate of the GM 14. The public key certificate of the GM 14 includes at least the public key of the GM 14 and the digital signature of the certificate authority server 20.

The other-device key storage unit 38 stores the public key certificate of each of the plurality of home electric appliances 16 participating in the HEMS 12. The public key certificate of a given home electric appliance 16 includes the public key of the home electric appliance 16 and the digital signature of the certificate authority server 20. Further, the other-device key storage unit 38 stores session keys (different sessions keys for different home electric appliances 16) for communication with the plurality of home electric appliances 16.

The control unit 32 includes a mutual certification unit 40, a certificate provision unit 42, a CRL acquisition unit 44, a CRL generation unit 46, and a CRL distribution unit 48. A computer program in which a plurality of these functional blocks are implemented may be stored in a recording medium and installed in a storage of the GM 14 via the recording medium. Alternatively, the computer program may be installed in the storage of the GM 14 via a communication network. The CPU of the GM 14 may exhibit the functions of the respective functional blocks by reading the computer program into the main memory and executing the computer program.

The mutual certification unit 40 performs a mutual certification process for mutual certification between the GM 14 and the plurality of home electric appliances 16 within the HEMS 12. In the embodiment, the mutual certification unit 40 performs mutual certification and key exchange according to an elliptic curve Diffie-Hellman (ECDH) key exchange protocol. A description will be given of the mutual certification process between the GM 14 and the home electric appliance 16a, but a similar process is performed between the GM 14 and the home electric appliance 16b and between the GM 14 and the home electric appliance 16c.

First, the home electric appliance 16a transmits the public key certificate Cd of the home electric appliance 16a to the GM 14. The mutual certification unit 40 checks the CRL stored in the CRL storage unit 39 against the serial number of the public key certificate Cd to see whether the public key certificate Cd has not been revoked. When the public key certificate Cd has not been revoked, the mutual certification unit 40 verifies the signature of the CA included in the public key certificate Cd. When the verification is successful, the mutual certification unit 40 performs a hash calculation (e.g., K=Hash (Dm×Qd)) based on the public key Qd of the home electric appliance 16a included in the public key certificate Cd and the secret key Dm of the GM 14 stored in the local key storage unit 36. Thereby, the mutual certification unit 40 derives a session key K. The mutual certification unit 40 stores the public key certificate Cd of the home electric appliance 16a and the session key K in the other-device key storage unit 38, mapping the public key certificated Cd and the session key K to the home electric appliance 16a.

The mutual certification unit 40 transmits the public key certificate Cm of the GM 14 stored in the CRL storage unit 39 to the home electric appliance 16a. The home electric appliance 16a checks the CRL stored in the home electric appliance 16a against the serial number of the public key certificate Cm to see whether the public key certificate Cm has not been revoked. When the public key certificate Cm has not been revoked, the home electric appliance 16a verifies the signature of the CA included in the public key certificate Cm. When the verification is successful, the home electric appliance 16a performs a hash calculation (e.g., K=Hash (Dd×Qm)) based on the public key Qm of the GM 14 included in the public key certificate Cm and the secret key Dd of the home electric appliance 16a. Thereby, the home electric appliance 16a derives a session key K. Through these steps, the GM 14 and the home electric appliance 16a exchange the session K safely to make encrypted communication possible.

When the public key certificate of another device (in the embodiment, another home electric appliance 16 participating in the same HEMS 12) is requested from the home electric appliance 16, the certificate provision unit 42 transmits the public key certificate of the other device stored in the other-device key storage unit 38 to the requesting home electric appliance 16. The data transmitted and received between the requesting home electric appliance 16 and the GM 14 is encrypted by the session key exchanged between the requesting home electric appliance 16 and the GM 14 in advance.

The CRL acquisition unit 44 acquires the data for the original CRL transmitted from the certificate authority server 20 (hereinafter, also referred to as "original CRL") via the communication unit 30 and the external network 22. The CRL acquisition unit 44 stores the original CRL thus acquired in the CRL storage unit 39.

The CRL generation unit 46 generates a CRL (hereinafter, also referred to as "intra-HEMS CRL") produced by extracting information on the plurality of HEMS devices managed by the CM 14 from the original CRL acquired by the CRL acquisition unit 44. The intra-HEMS CRL is a CRL in which, of the serial numbers of the public key certificates set in the original CRL, only those serial numbers of the public key certificates of the home electric appliances 16 participating in the HEMS 12 managed by the GM 14 are set. The intra-HEMS CRL is a CRL valid within the HEMS 12 managed by the GM 14.

More specifically, when a serial number of the public key certificate stored in the other-device key storage unit 38 is found in the serial numbers of the public key certificates listed in the original CRL, the CRL generation unit 46 identifies the serial number found in the list. The public key certificate stored in the other-device key storage unit 38 is a public key certificate of the home electric appliance 16 for which mutual certification is successful and the key is managed. The CRL generation unit 46 generates the intra-HEMS CRL by organizing the list that lists only the identified serial numbers in the format of the X.509 standard. The CRL generation unit 46 also appends a digital signature signed by the secret key of the GM 14 to the intra-HEMS CRL.

FIG. 3A shows an example of the original CRL, and FIG. 3B shows an example of the intra-HEMS CRL. The original CRL could include information on one or more devices managed by the GM 14. The original CRL of FIG. 3A includes the serial number of the public key certificate of the home electric appliance 16b and the serial number of the public certificate of the home electric appliance 16c. The original CRL could further include information on a device not managed by the GM 14. The original CRL of FIG. 3A includes the serial number of the public key certificate of a home electric appliance X (not shown) participating in another HEMS 12.

Meanwhile, the intra-HEMS CRL includes only the information on the devices managed by the GM 14, and the information on the devices not managed by the GM 14 is excluded. The intra-HEMS CRL of FIG. 3B includes the serial number of the public key certificate of the home electric appliance 16b and the serial number of the public key certificate of the home electric appliance 16c but does not include the serial number of the public key certificate of the home electric appliance X (not shown).

Referring back to FIG. 2, the CRL distribution unit 48 transmits the data for the intra-HEMS CRL generated by the CRL generation unit 46 and having the digital signature signed by the secret key of the GM 14 appended thereto to the plurality of home electric appliances 16 via the communication unit 30 and the home network 18. By distributing the intra-HEMS CRL to the plurality of home electric appliances 16 participating in the HEMS 12 managed by the GM 14, the CRL distribution unit 48 restricts the home electric appliances 16 from communicating with other devices (in the embodiment, other home electric appliances 16 participating in the same HEMS 12) for which the public key is revoked.

Figure 4:
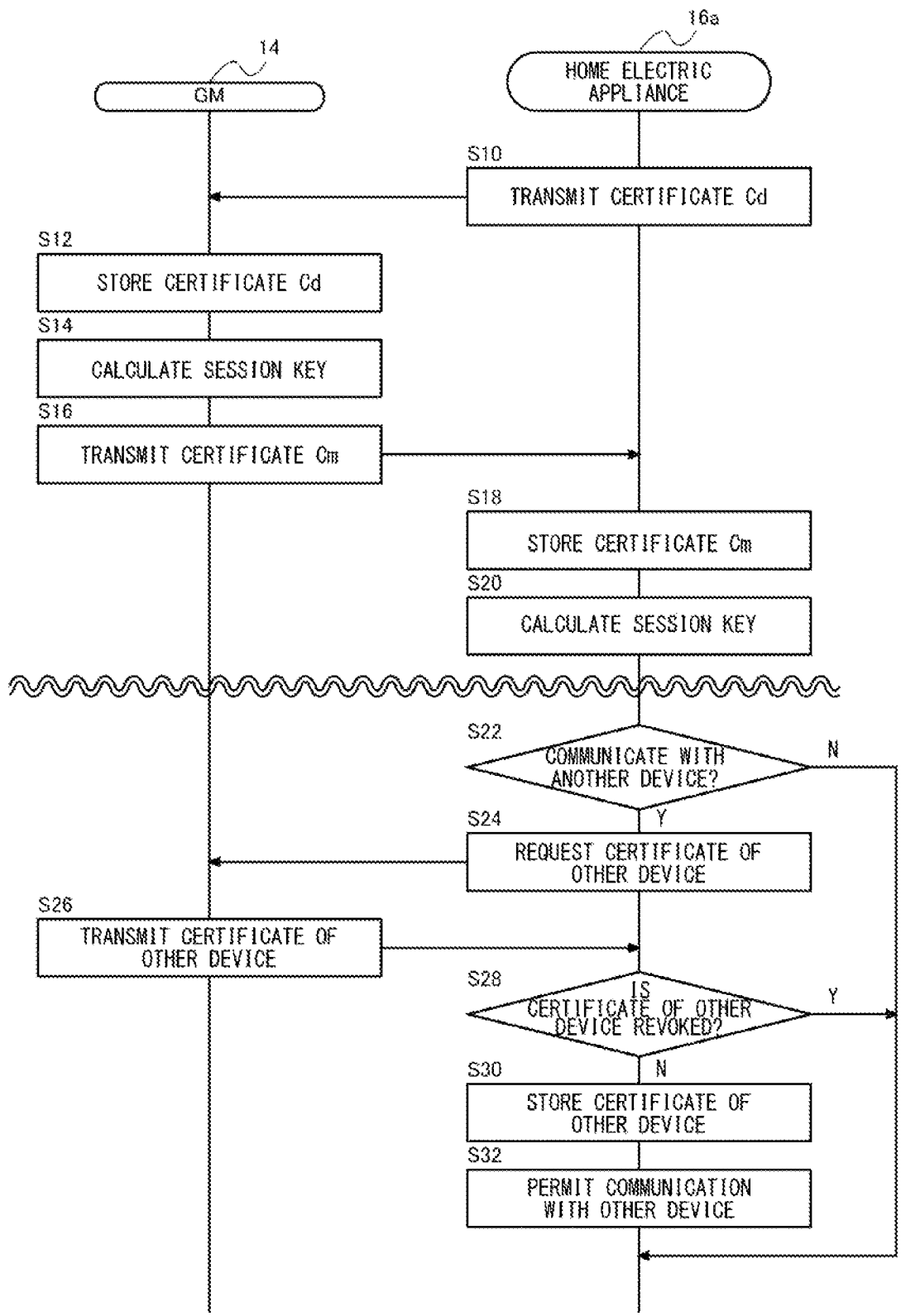
FIG. 4 is a flowchart showing the operation of the communication system according to the embodiment.
Figure 5:
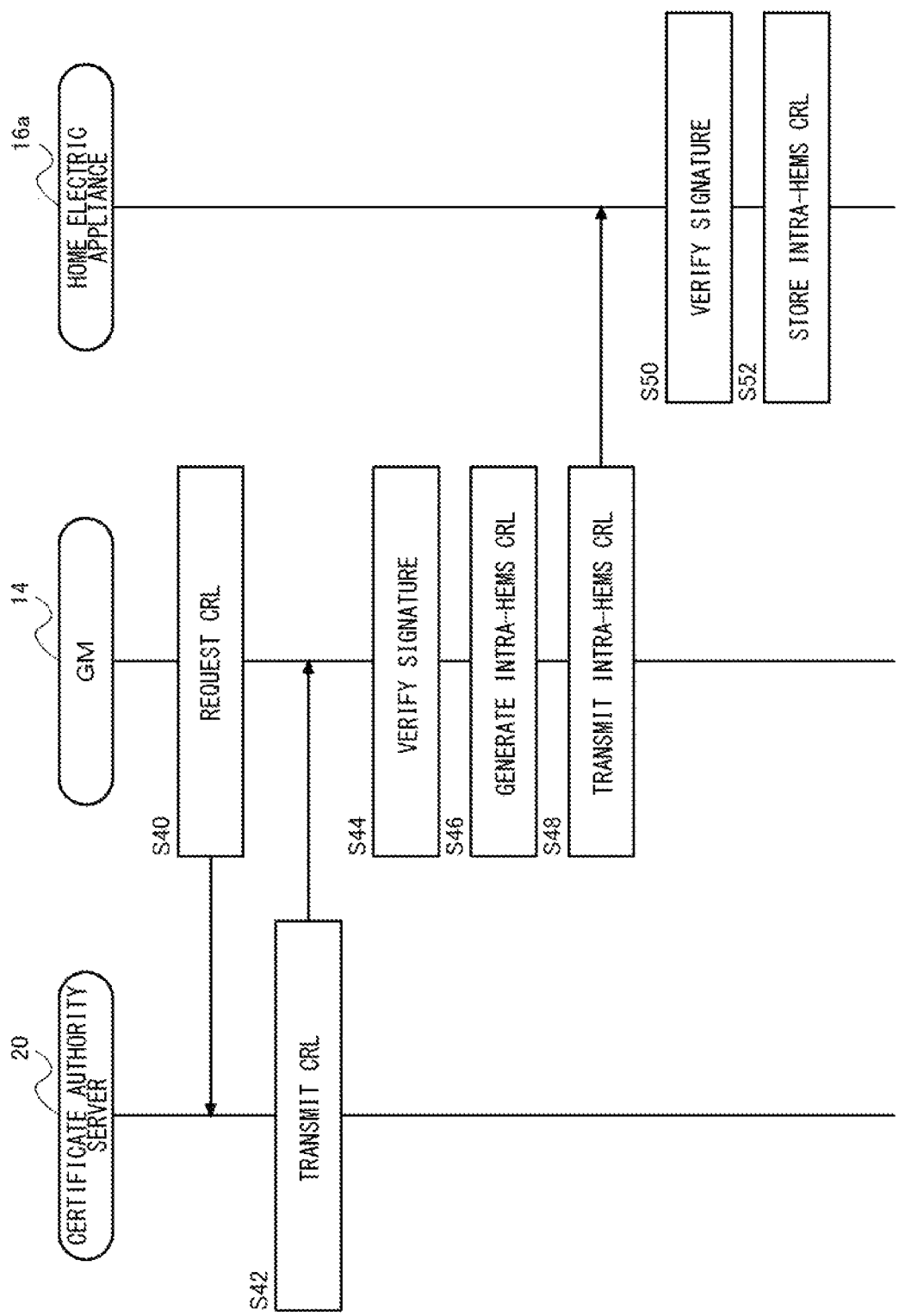
FIG. 5 is a flowchart showing the operation of the communication system according to the embodiment.

A description will now be given of the operation of the communication system 10 configured as described above. FIGS. 4 and 5 are flowcharts showing the operation of the communication system 10 according to the embodiment. FIGS. 4 and 5 show the operation of the home electric appliance 16a, of the plurality of home electric appliances 16, and show the interaction between the home electric appliance 16a and the GM 14. However, the operation of the other home electric appliances 16 and the interaction between the other home electric appliances 16 and the GM 14 are also as shown in the figures.

FIG. 4 shows the operation of mutual certification (key exchange) between the GM 14 and the home electric appliance 16a and the operation of the home electric appliance 16a performed during communication. The home electric appliance 16a transmits the public key certificate Cd of the home electric appliance 16a to the GM 14 (S10). When the original CRL stored in the CRL storage unit 39 does not designate the serial number of the public key certificate Cd of the home electric appliance 16a (i.e., when the public key certificate Cd of the home electric appliance 16a is not revoked), the mutual certification unit 40 of the GM 14 stores the public key certificate of the home electric appliance 16a in the other-device key storage unit 38 (S12). Further, the mutual certification unit 40 of the GM 14 derives the session key K based on the public key certificate of the home electric appliance 16a and the secret key of the GM 14 (S14).

The mutual certification unit 40 of the GM 14 transmits the public key certificate Cm of the GM 14 to the home electric appliance 16a (S16). When the CRL stored in the home electric appliance 16a does not include the serial number of the public key certificate Cm of the GM 14 (i.e., when the public key certificate Cm of the GM 14 is not revoked), the home electric appliance 16a stores the public key certificate of the GM 14 (S18). Further, the home electric appliance 16a derives the session key K based on the public key certificate Cm of the GM 14 and the secret key of the home electric appliance 16a (S20).

When the home electric appliance 16a should communicate with another device (e.g., the home electric appliance 16b within the same HEMS 12 (Y in S22), the home electric appliance 16a requests the public key certificate of the other device to communicate with (hereinafter, "destination device") from the GM 14 (S24). The certificate provision unit 42 of the GM 14 transmits the requested public key certificate of the destination device to the GM 14 (S26). When the CRL stored in the home electric appliance 16a (in the embodiment, the intra-HEMS CRL) does not include the serial number of the public key certificate of the destination device (N in S28), the home electric appliance 16a stores the public key certificate of the destination device (S30).

Subsequently, the home electric appliance 16a permits communication with the destination device using the public key certificate of the destination device (S32). For example, the home electric appliance 16a encrypts an electronic message to the destination device by the public key of the destination device and transmits encrypted data to the destination device. The home electric appliance 16a also detects whether or not the received data is falsified by verifying the digital signature appended to the data received from the destination device by using the public key of the destination device.

When the intra-HEMS CRL designates the serial number of the public key certificate of the destination device (Y in S28), the home electric appliance 16a discards the public key certificate of the destination device without storing it and prohibits communication with the destination device. When it is not time to communicate with another device (N in S22), S24 and the subsequent steps are skipped.

FIG. 5 shows the operation related to CRL distribution. The CRL acquisition unit 44 of the GM 14 requests the CRL from the certificate authority server 20 at a predetermined point of time or periodically (S40). The certificate authority server 20 transmits the CRL having the signature of the certificate authority server 20 appended thereto to the GM 14 (S42). The CRL acquisition unit 44 of the GM 14 acquires the CRL transmitted from the certificate authority server 20 as the original CRL.

The CRL generation unit 46 of the GM 14 versifies the signature of the certificate authority server 20 appended to the original CRL (S44). When the verification is successful, the CRL generation unit 46 extracts the information on the home electric appliances 16 managed by the GM 14 from the original CRL and generates the intra-HEMS CRL in which the extracted information on the home electric appliances 16 is arranged (S46). The CRL generation unit 46 appends the signature of the GM 14 to the intra-HEMS CRL. The CRL distribution unit 48 of the GM 14 transmits the intra-HEMS CRL to the home electric appliance 16a (S48).

The home electric appliance 16a verifies the signature of the GM 14 appended to the intra-HEMS CRL transmitted from the GM 14 (S40). When the verification is successful, the home electric appliance 16a stores the intra-HEMS CRL transmitted from the GM 14 (S42). Subsequently, the intra-HEMS CRL stored in S42 is referred to in the determination on validity in S28 of FIG. 4.

The GM 14 according to the embodiment delivers the intra-HEMS CRL limited to the information on the HEMS devices managed by the GM 14 to the HEMS devices instead of delivering the original CRL issued by the CA directly to the HEMS devices managed by the GM 14. The size of the CRL maintained by the HEMS devices will be commensurate with the number of devices managed by the GM 14 at a maximum. This suppresses the amount of hardware resources of the HEMS devices. Stated otherwise, the hardware resources of the HEMS devices are prevented from becoming scarce by maintaining the CRL or using the CRL.

When communicating with another device within the same HEMS 12, the HEMS device (e.g., the home electric appliance 16) of the embodiment acquires the public key certificate of the other device from the GM 14. When it is verified that the public key certificate of the other device is revoked by referring to the intra-HEMS CRL, the HEMS device discards the public key certificate of the other device without storing it. This reduces the number of public key certificates maintained by the HEMS device.

Described above is an explanation based on an exemplary embodiment. The embodiments is intended to be illustrative only and it will be understood by those skilled in the art that various modifications to constituting elements and processes could be developed and that such modifications are also within the scope of the present disclosure.

Any combination of the embodiment and a variation will also be useful as an embodiment of the present disclosure. A new embodiment created by a combination will provide the combined advantages of the embodiment and the variation as combined. It will be understood to a skilled person that the functions that the constituting elements recited in the claims should achieve are implemented either alone or in combination by the constituting elements shown in the embodiments and the variations.

The technologies according to the embodiment and variations may be defined by the following items.

[Item 1]

A communication apparatus (14) adapted to manage a plurality of devices (16), including:

an acquisition unit that acquires a first certificate revocation list designating revoked public key certificates and distributed from a certificate authority;

a generation unit (46) that generates a second certificate revocation list produced by extracting information on the plurality of devices from the first certificate revocation list acquired by the acquisition unit (44); and a distribution unit (48) that restricts communication with a device for which the public key certificate is revoked, by distributing the second certificate revocation list generated by the generation unit (46) to the plurality of devices (16).

According to this communication apparatus, the amount of data for the certificate revocation list stored in each of the plurality of devices (e.g., HEMS devices) managed by the communication apparatus is reduced. This facilitates reduction in the amount of hardware required and the amount thereof used in the plurality of devices and reduction in the cost of the plurality of devices.

[Item 2]

The acquisition unit (44) may acquire the first certificate revocation list transmitted from an apparatus (20) of the certificate authority, via a communication network (22).

The generation unit (46) may be implemented by using a processor of the communication apparatus (14) to execute a predetermined computer program.

The distribution unit (48) may transmit the second certificate revocation list to the plurality of devices (16) via the communication network (18).

Thus, the communication apparatus is implemented by the cooperation of the communication apparatus, and computer hardware and software.

[Item 3]

A communication system including:

a plurality of devices (16); and a management apparatus (14) that manages the plurality of devices, wherein the plurality of devices (16) restrict communication with a device for which a public key certificate is revoked, the management apparatus (14) includes:

an acquisition unit (44) that acquires a first certificate revocation list designating revoked public key certificates and distributed from a certificate authority;

a generation unit (46) that generates a second certificate revocation list produced by extracting information on the plurality of devices (16) from the first certificate revocation list acquired by the acquisition unit (44); and a distribution unit (48) that distributes the second certificate revocation list generated by the generation unit (46) to the plurality of devices (16).

According to this communication system, the amount of data for the certificate revocation list stored in each of the plurality of devices (e.g., HEMS devices) managed by the communication apparatus is reduced.

This facilitates reduction in the amount of hardware required and the amount thereof used in the plurality of devices and reduction in the cost of the plurality of devices.

[Item 4]

The plurality of devices (16) may include a first device and a second device.

The first device may acquires the public key certificate of the second device from the management apparatus (14), and, when the second certificate revocation list does not designate the public key certificate of the second device, the first device may communicate with the second device by using the public key certificate of the second device.

According to this configuration, the first device need not maintain the public key certificate of the second device if the public key certificate of the second device is revoked so that the size of data stored in the first device is suppressed.

[Item 5]

A communication method comprising: acquiring, using a communication apparatus (14) adapted to manage a plurality of devices (16), a first certificate revocation list designating revoked public key certificates and distributed from a certificate authority;

generating, using the communication apparatus, a second certificate revocation list produced by extracting information on the plurality of devices (16) from the first certificate revocation list; and restricting, using the communication apparatus, communication with a device for which the public key certificate is revoked, by distributing the second certificate revocation list to the plurality of devices (16).

According to this communication method, the amount of data for the certificate revocation list stored in each of the plurality of devices (e.g., HEMS devices) managed by the communication apparatus is reduced.

This facilitates reduction in the amount of hardware required and the amount thereof used in the plurality of devices and reduction in the cost of the plurality of devices.

[Item 6]

A computer program that causes a communication apparatus (14) adapted to manage a plurality of devices (16) to:

acquire a first certificate revocation list designating revoked public key certificates and distributed from a certificate authority;

generate a second certificate revocation list produced by extracting information on the plurality of devices (16) from the first certificate revocation list; and restrict communication with a device for which the public key certificate is revoked, by distributing the second certificate revocation list to the plurality of devices (16).

According to this computer program, the amount of data for the certificate revocation list stored in each of the plurality of devices (e.g., HEMS devices) managed by the communication apparatus is reduced.

This facilitates reduction in the amount of hardware required and the amount thereof used in the plurality of devices and reduction in the cost of the plurality of devices.

INDUSTRIAL APPLICABILITY

The technology disclosed in the present disclosure is applicable to computers for managing a plurality of devices.

REFERENCE SIGNS LIST 10 communication system, 12 HEMS, 14 GM, 16 home electric appliance, 20 certificate authority server, 44 CRL acquisition unit, 46 CRL generation unit, 48 CRL distribution unit

The invention claimed is:

1. A communication system comprising:
a plurality of devices; and
a management apparatus that manages the plurality of devices, wherein
the plurality of devices restrict communication with a device for which a public key certificate is revoked,
the management apparatus includes:
an acquisition unit that acquires a first certificate revocation list designating revoked public key certificates and distributed from a certificate authority;
a generation unit that generates a second certificate revocation list produced by extracting information on the plurality of devices from the first certificate revocation list acquired by the acquisition unit; and
a distribution unit that distributes the second certificate revocation list generated by the generation unit to the plurality of devices, wherein
the plurality of devices include a first device and a second device,
the first device acquires the public key certificate of the second device from the management apparatus, and, when the second certificate revocation list does not designate the public key certificate of the second device, the first device communicates with the second device by using the public key certificate of the second device.

2. A communication method comprising:
acquiring, using a communication apparatus adapted to manage a plurality of devices, a first certificate revocation list designating revoked public key certificates and distributed from a certificate authority;
generating, using the communication apparatus, a second certificate revocation list produced by extracting information on the plurality of devices from the first certificate revocation list; and
restricting, using the communication apparatus, communication with a device for which the public key certificate is revoked, by distributing the second certificate revocation list to the plurality of devices, wherein
the plurality of devices include a first device and a second device, and
the communication method further comprises:
acquiring, using the first device, the public key certificate of the second device from the communication apparatus, and
when the second certificate revocation list does not designate the public key certificate of the second device, communicating, using the first device that uses the public key certificate of the second device, with the second device.

* * * * *